(No Model.)
J. PELTS.
PROCESS OF TEMPERING SAWS.
No. 400,248. Patented Mar. 26, 1889.
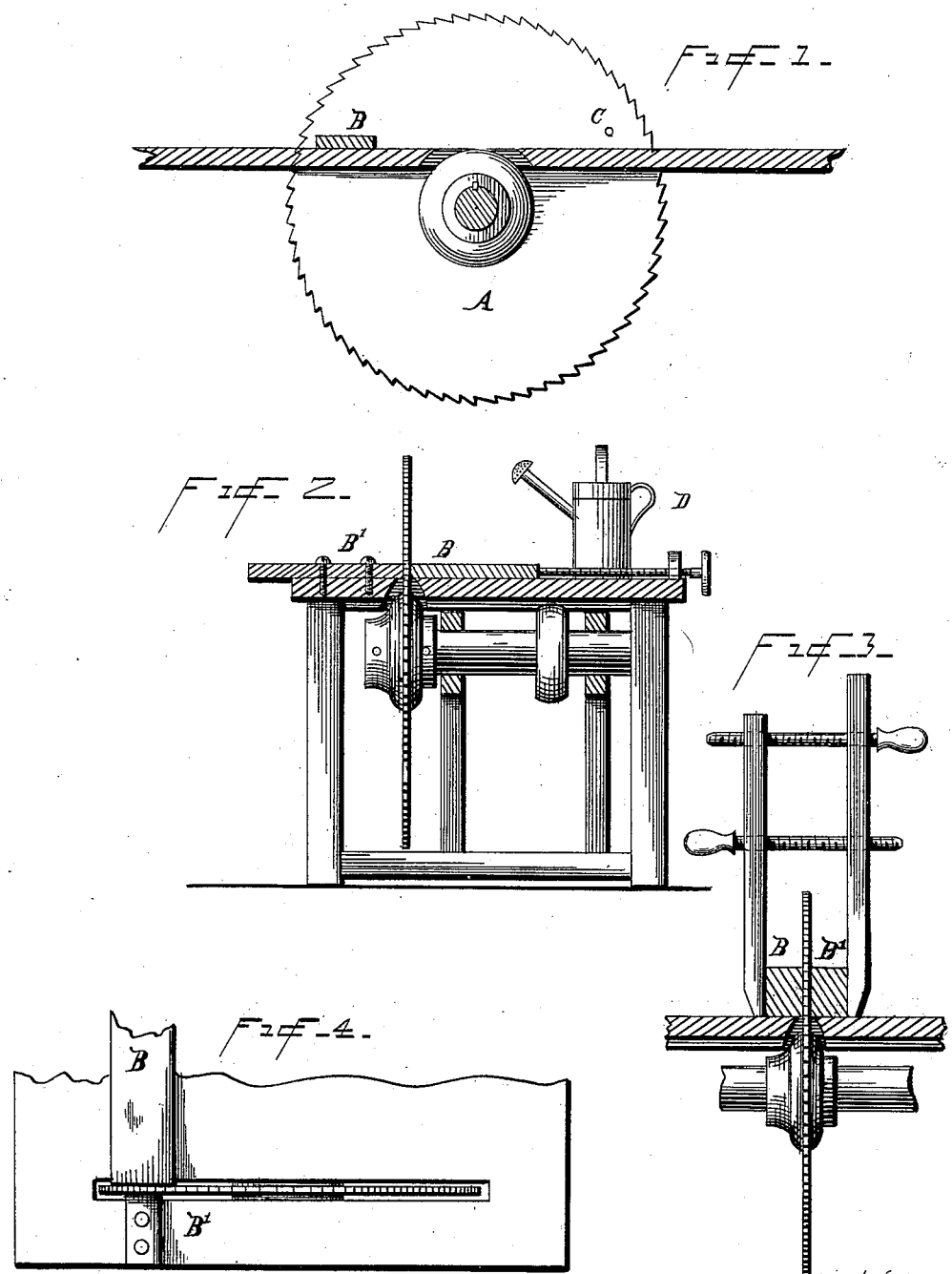

UNITED STATES PATENT OFFICE.

JOSEPH PELTS, OF VINCIT, MISSOURI.

PROCESS OF TEMPERING SAWS.

SPECIFICATION forming part of Letters Patent No. 400,248, dated March 26, 1889.

Application filed October 1, 1888. Serial No. 286,826. (No model.)

*To all whom it may concern:*

Be it known that I, JOSEPH PELTS, residing at Vincit, in the county of Dunklin and State of Missouri, have invented certain new and useful Improvements in the Process of Tempering Saws, of which the following is a specification, reference being had therein to the accompanying drawings.

This invention relates to an improved method of tempering or retempering saws, especially such as are known as "rim-bound" saws, wherein the saws are in the condition that the metal is somewhat contracted at the periphery, and the saw-blade is therefore in condition to buckle. The method is also applicable to removing blisters or kinks from saw-blades.

The invention consists in the series of steps hereinafter described.

To operate on a rim-bound saw, a convenient method is to saw a seasoned board, so that the end is perfectly true, then, without removing the saw from its arbor, press the end of the board firmly against the side of the saw-blade, as close as possible to the teeth. The opposite side of the saw must be supported or braced when necessary. The saw is then put in motion at a high speed, and the friction of the bearing-piece will soon cause that part next the teeth to become very hot, which will of course cause expansion of the metal. While the metal is hot, water is suddenly applied, thus suddenly cooling the saw, renewing the temper, and fixing the metal in the expanded position. The process may be repeated as often as found necessary. Usually three or four heatings and coolings will be sufficient. If the saw is "blistered," a hole should first be drilled through the center of the blister, and that part of the saw which contains the blister may be heated by pressing a block of wood or other material against the saw when in rapid rotation. Then when the blade is hot by friction it is cooled suddenly by the application of cold water or oil.

It will be at once apparent that there are many ways of heating a specified portion of a saw-blade by friction without removing it from its arbor or carriage.

In the drawings, Figure 1 is intended to represent a side elevation of a saw, a table, and a bearing-block against the saw. Fig. 2 is an end view of a saw, table, and clamping mechanism for pressing the saw-blade. Fig. 3 represents an end view of a saw with a clamp-screw and friction-rubbers applied. Fig. 4 is a plan.

A indicates a saw-blade, and B B' friction blocks or rubbers held against the side of the saw.

C denotes a drill-hole through a blister; D, a water-pot.

It is apparent that the part of the saw heated by this method will be an annulus surrounding the arbor. That part only of the saw need be heated which it is desired to expand, leaving the rest of the saw-blade cool. This differs from the heating while the saw is in use, for the whole blade is then heated to some extent.

It is apparent that the rubber may be applied to the surface of the saw on one or both faces, and held by any suitable supports or by hand. The leading feature is that an annular portion will be more uniformly heated than can be done by hammering, and this without removing the saw from the arbor, and the cooling can be done by the application of water.

What I claim is—

1. The method hereinbefore described of tempering saws and removing rim-bound kinks, &c., which consists in pressing a rubbing-piece firmly against the face of the saw while in rapid motion, thus heating a part of the blade, then suddenly cooling the same, substantially as described.

2. The method hereinbefore described of removing blisters, kinks, &c., from saws, which consists in drilling holes in the blade at proper places, then driving the saw at a high speed and heating a portion by pressing a rubbing-block against it, and then suddenly cooling, substantially as described.

In testimony whereof I affix my signature in presence of two witnesses.

JOSEPH PELTS.

Witnesses:
A. B. MOBLEY,
T. R. R. ELY.